(12) United States Patent
Ito et al.

(10) Patent No.: US 7,005,427 B2
(45) Date of Patent: Feb. 28, 2006

(54) CELLULOSE ACYLATE SOLUTION FOR FILM PRODUCTS

(75) Inventors: Takashi Ito, Kanagawa (JP); Masaharu Terayama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/857,946

(22) Filed: Jun. 2, 2004

(65) Prior Publication Data

US 2004/0244647 A1   Dec. 9, 2004

(30) Foreign Application Priority Data

Jun. 3, 2003   (JP) .............................. 2003-157506

(51) Int. Cl.
*A61K 31/715*   (2006.01)
*C23C 16/40*   (2006.01)
*C08B 3/22*   (2006.01)

(52) U.S. Cl. ...................... 514/57; 536/76; 106/287.1; 427/255.37

(58) Field of Classification Search ................. 514/57; 106/287.1; 427/255.37; 536/76
See application file for complete search history.

(56) References Cited

U.S. PATENT DOCUMENTS 6,881,454 B1 * 4/2005 Taguchi ...................... 428/1.1
2002/0185695 A1 * 12/2002 Beasom ...................... 257/402
2004/0077752 A1 * 4/2004 Matsufuji et al. ............. 524/37

FOREIGN PATENT DOCUMENTS

JP   WO 02/059192 A1 *  8/2002

* cited by examiner

*Primary Examiner*—James O. Wilson
*Assistant Examiner*—Matthew Fedowitz
(74) *Attorney, Agent, or Firm*—Birch Stewart Kolasch & Birch LLP

(57) ABSTRACT

A cellulose acylate solution is used for producing a film in a solution casting method. Particles to be added to the cellulose acylate solution are silicon dioxide and surfaces of the particles are positively charged. After the particles are added to the solution, the filtrated solution is used for the film production. Thus the aggregation is prevented, and after the filtration pressure increases, the particles of large size are not contained in the filtrated solution. The obtained film contains a small amount of foreign materials and the situation of the film surface is good.

13 Claims, 1 Drawing Sheet

CELLULOSE ACYLATE SOLUTION FOR FILM PRODUCTS

This Nonprovisional application claims priority under 35 U.S.C. § 119(a) on Patent Application No(s). 2003-157506 filed in JAPAN on Jun. 3, 2003, the entire contents of which are hereby incorporated by reference.

BACKGROUND OF THE INVENTION

1. Field of the Invention

The present invention relates to a cellulose acylate solution for film production, and especially to a cellulose acylate solution for film production that is used in a polarizing filter and a liquid crystal display.

2. Description Related to the Prior Art

Cellulose acylate film is used for photographic film, animation film and so on, and is widely used in optical fields because of properties, such as transparency, adequate moisture permeability and high mechanical strength, and dimensional resistance, which do not depend on the humidity and the temperature so much. Recently, as the demand for the liquid crystal display becomes larger, the performance thereof has advanced and the liquid crystal display becomes larger, it is remarkable that the demands of the protective film for a polarizing filters used in the liquid crystal display remarkably increases. Recently, it is required to show image more finely for the liquid crystal display. Therefore, it becomes more necessary to increase the smoothness and to reduce the foreign materials in the cellulose acylate film to be used in the liquid crystal display.

Cellulose acylate film is often produced by a solution casting method, in which a film having extremely high smoothness is produced. However, the high smoothness causes the adhesion of different surface portions of the film in winding the produced film around a winding spindle. When the film is used, it is unwound to peel the adhered surface portions thereof, and thereby an unnecessary large force is applied to the film surface. Thus the film has peppered surface with deformation or unevenness and is deformed, which causes an extreme decrease the function of the protective film for the polarizing filter.

In order to prevent the adhesion, the film surface needs to have adequate roughness, and therefore particles called matting agents are contained in the film. When the content of the matting agent is adequate, the damage of the film, such as the deformation and the like, is prevented.

In the matting agents there are several sorts of metal oxides, metal salts, organic materials, polymers and the like, and they always contain clusters (coarce particles) formed by aggregation. When particles and such clusters are mixed as foreign materials in the film, the foreign materials cause a damage of the film. Further, when the filtration is made to remove the clusters from a polymer solution (hereinafter dope), the clusters occlude the filter pores immediately, and therefore the serial production can not be made stably. Accordingly, the matting agent used for the dope is rarely used without the dispersing process to micro particles by any method.

There are micro particles, each of which has a lot of hydroxyl groups on a surface thereof, and therefore has hydrophilic property. Such micro particles easily aggregate in the dope in which a hydrophobic solvent is used, and a representative example thereof is $SiO_2$ micro particles. In order to reduce the aggregation, the Japanese Patent Laid-Open Publication No. 7-11055 (Pages 2–4, FIG. 2) supposes that the surface of each particle may have methyl groups to provide the hydrophobic property for the micro particles. In this case, the methylation of the surface is made. Further, Japanese Patent Laid-Open Publication No. 2001-2799 supposes that the surface of each particle may have alkyl groups and the number of carbons in each alkyl group on the surfaces may be at least 2 and at most 20 so as to provide the hydrophobic property for the micro particles. In this case, the alkylation of the surface is made.

By the way, in the solution casting method, the dope of the cellulose acylate solution is prepared from cellulose acylate and several sorts of additives. The dope is cast onto a substrate with use of a casting die. When the dope on the substrate to form a polymer film, the polymer film is peeled from the substrate and dried in a drying process. As the substrate, a continuously rotatable drum or a continuously movable belt is used.

The dope prepared through dissolution of cellulose acylate and the additives to the solvent usually contains much undissolved foreign materials, such as impurities and gel-like materials. When the film is produced by casting such dope, the undissolved foreign materials remain also in the film to damage the surface conditions of the film. Accordingly, the quality of the film as the product becomes lower, and the film cannot be used. Therefore the filtration is performed at least once before the casting.

In the filtration, several sorts of filtrers are used depending on characteristics of the dope and the required properties. As materials of the filters, there are filter cloth, filter paper, metal mesh, metal fiber, non-woven cloth and the like. Further, a criterion for the small content of the undissolved foreign materials is extremely strict in case of the dope of cellulose acylate solution used for the film production. Therefore the plural filtration devices are connected in series, such that the filtration of the dope may be made plural times to improve the property of the dope.

The filter used for the filtration has the filter pores being very narrow passage of the dope. When the dope flows through the filter pores in performing the filtration, the materials having larger diameter than the filter pores are removed from the dope. Further, in some filters, the diameters of the filter pores are not uniform, and the passages of the filter pores are complexly bent and branches. Accordingly, also the particles having the smaller diameter than the filter pores are caught or trapped at branching or bending parts. Thus the foreign materials are removed by the filtration to obtain a clean filtrated solution.

However, in the hydrophobilization of the surfaces of $SiO_2$ particles, the continuous existence or generation of the aggregation is hardly prevented, and the produced film is not adequate to use in the liquid crystal display showing images highly fine.

Further, the micro particles are transported through the filter along the flow line of the dope. On the upstream side of the filter, the flow line thickens at the filter, and therefore the distance between the micro particles becomes smaller to progress the aggregation more. This phenomenon cannot be prevented by the hydrophobilization as above described, since the surfaces of the micro particles are not entirely hydrophobilized or the inside of the particles appears in dispersing the particles to form an interface to the solvent.

As described above, parts of the clusters formed through this aggregation are trapped by the filter material, and the ratio of the occluded filter becomes higher and the filtration pressure becomes larger in the continuous filtration. When the filtration pressure becomes higher, some of the trapped particles are pressed out from the filter and are mixed in the filtrated solution flowing in the downstream side from the filter. Thus the particles pressed out from the filter are contained in the produced film, and the quality of the product becomes lower.

SUMMARY OF THE INVENTION

An object of the present invention is to provide a cellulose acylate solution for a film production, in which the mixture of the foreign materials that is caused by the increase of the filtration pressure is prevented.

Another object of the present invention is to provide cellulose acylate solution for a film production, in which the aggregation of the solid materials is prevented.

In order to achieve the object and the other object, a cellulose acylate solution of the present invention contains particles whose surfaces are positively charged.

Further, the particles are preferably silicon compounds including silicon dioxide. Particularly preferably, the cellulose acylate solution is obtained by steps of initially adding the particles being charged, and then filtrating in such a manner that the particles remain.

Further, the cellulose acylate solution is cast for forming a cellulose acylate film.

According to the cellulose acylate solution of the present invention, it is prevented in processes of producing the cellulose acylate film that the filtration pressure applied for filtrating the cellulose acylate solution increases to mix impurities with the filtered solution. Thus the cellulose acylate solution of the present invention is effective to reduce the aggregation of solid materials passes through the filter.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
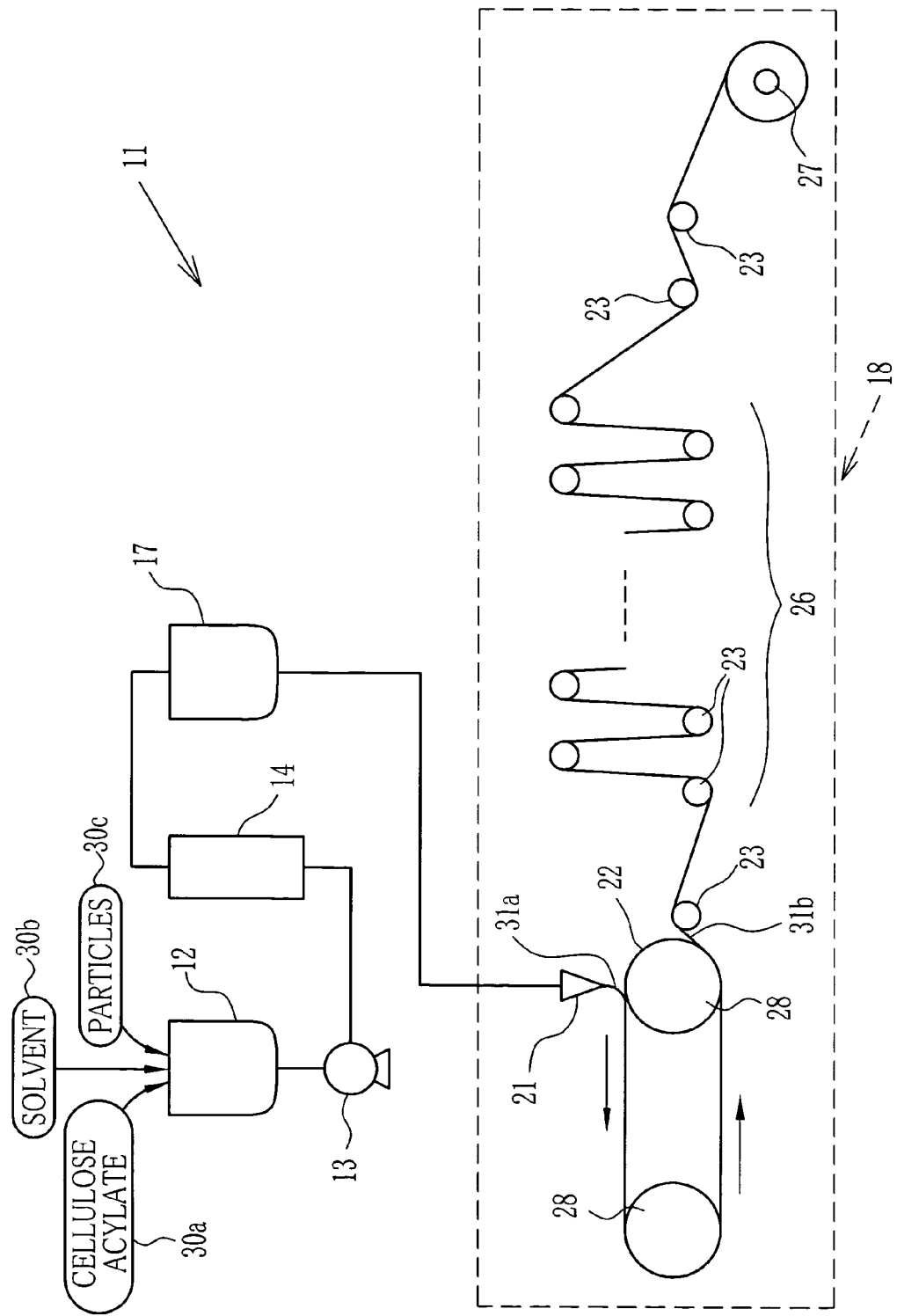
FIG. 1 is a schematic diagram of a film production equipment as an embodiment of the present invention.

In FIG. 1, a film production equipment 11 is constructed of a stock tank 12, a pump 13, a filtration device 14, a reserving tank 17, a solution casting apparatus 18, and solution feeding paths which connecting them serially. Further, the solution casting apparatus 18 is substantially constructed of a casting die 21, a belt 22 as the substrate, plural rollers 23 for transporting a cellulose acylate film 31b, a drying device 26 and a winding device 27. Note that in this embodiment is used the belt 22 as the substrate that is continuously moved by rotating backup rollers 28. However, in the present invention a drum is also used as the substrate. Further, the present invention is not restricted in the above film production equipment.

The stock tank 12 contains a cellulose acylate solution 31a (or a dope) prepared from cellulose acylate 30a, solvent 30b and particles 30c. The pump 13 is driven to feed out the cellulose acylate solution 31a through the filtration device 14 from the stock tank 12 to the reserving tank 17 for storing. Then the cellulose acylate solution 31 is fed out from the reserving tank 17, and cast by the casting die 21 on the belt 22. Then the cellulose acylate solution 31 on the belt 22 has the self-supporting property to form a cellulose acylate film 31b, which is peeled from the belt 22. The peeled cellulose acylate film 31b is transported with the rollers 23 into the drying device 26. In the drying device 26, the drying of the cellulose acylate film 31b is made enough with transporting by the rollers 23. Thereafter the cellulose acylate film 31b is wound by the winding device 27. In the drying device 26, a tenter device (not shown) is sometimes provided to regulate the width of the cellulose acylate film 31b or to stretch the cellulose acylate film 31b with the drying. Note that the cellulose acylate solution 31a of the present invention includes a dispersion in which undissolved materials are dispersed, and a main content of the solid materials before dissolution is cellulose acylate.

In the cellulose acylate solution 31a, cellulose acylate and several sorts of additives and the like are dissolved to or dispersed in the solvent. The additives contain matting materials, and particles are used as the matting materials. Note that the matting agent is usually called an antiblocking agent or anti-creaking agent.

It is preferable that surfaces of the particles to be added to the cellulose acylate solution 31a are positively charged. And there are several well-known methods of making the surface positively charged. For example, there is a method of bonding cationic monomers and the like to molecules on surfaces of particles. Further, in the situation that the surface is positively charged, there are cationic functional groups on the surfaces of the particles, for example, amino group, ammonium group, phosphonium group, pyridinium group and the like. Thus the surface is positively charged in the present invention. Accordingly when the cellulose acylate solution 31a is prepared or also flows through the filtration device, the aggregation of the particles is prevented, and the properties and characteristics of the cellulose acylate solution 31a and the cellulose acylate film 31 are improved.

As the particles whose surface is positively charged, there are organic and inorganic compounds. The preferable inorganic compounds of the particles are compounds containing silicon (silicon dioxide and the like), titanium oxide, zinc oxide, aluminum oxide, barium oxide, zirconium oxide, strontium oxide, antimony oxide, tin oxide, tin antimony oxide, calcium carbonate, talc, clay, calcined caoline, calcined calcium silicate, calcium silicate hydrate, aluminum silicate, magnesium silicate, calcium phosphate and the like. Particularly preferable is zirconium oxide and inorganic compounds containing silicon. Especially preferable are silicone derivatives, such as silicon dioxide and the like, since turbidity of the cellulose acylate film becomes lower.

Further, the preferable organic compounds of the particles whose surfaces are positively charged are polymers, for example, silicone resins, fluorocarbon resins, acryl resins and the like. Particularly preferable are silicone resins, and especially, silicone resins having a three-dimensional network structure.

In the present invention, the method of adding the particles to the cellulose acylate solution is not restricted. For example, the particles are added when the cellulose acylate and the solvent are mixed, or after the mixture of the cellulose acylate and the solvent is prepared. Further, the particles may be added just before the casting of the cellulose acylate solution. The particles may be directly added, and otherwise the particles are previously dissolved while the solvent and preferably cellulose acylate is used as a binder. Further, there are cases that the particles are dispersed to prepare the stabilized dispersion or solution.

More concretely, there are three methods as described below. Primary, the particles and the solvents are mixed with stirring, and thereafter the particles are dispersed in the solvent with a dispersing device to prepare the dispersion.

Then the dispersion is added to cellulose acylate with stirring. Secondary, the particles and the solvents are mixed with stirring, and thereafter the particles are dispersed in the solvent with a dispersing device to prepare the dispersion. And the cellulose acylate is added to the solvent, and this mixture is stirred to dissolve the cellulose acylate to the solvent. Then the dispersion is added to the cellulose acylate solution and stirred to obtain the cellulose acylate solution with content of particles, and thereafter the mixture of the particles and the solution is made enough with a tank and an inline mixer. Thirdly, a small amount of cellulose acylate is added to the solvent with stirring to make a solution to which the particles are added. The dispersion of the particles is made with a dispersing device to obtain a liquid containing particles. The liquid and the solution of cellulose acylate are mixed enough with use of the tank and the inline mixer.

The averaged diameter of the initial particles are, in view of keeping the haze of the produced film low, preferably 0.001–20 μm, particularly 0.001–10 μm, especially 0.002–1 μm, and most especially 0.005–0.5 μm. The measurement of the averaged diameter of the initial particles is made with a transmission electron microscope to obtain an average of diameters. The apparent specific gravity of the particles is preferably at least 30 g/liter, particularly 50 g/liter–200 g/liter, and especially 50 g/liter–100 g/liter.

The concentration of the particles in dispersing the mixture of the particles and the solvent may be adequately set. When silicon dioxide is used as the material of the particles, the concentration is preferably at most 30% by mass, preferably at most 20% by mass, and especially from 1% by mass to 10% by mass. The solvent materials used for the dispersion are lower alcohol, preferably methyl alcohol, ethyl alcohol, propyl alcohol, isopropyl alcohol, butyl alcohol and the like. The other solvent materials than the lower alcohol is not restricted especially. However it is preferable that the solvent material (other than alcohols) for preparing the dispersion may be the same as that used at producing the film.

There are a media type and a media-less type in the dispersing device used for dispersing the particles in the solvent or the cellulose acylate solution. In the media type, there are a boll mill, a sand mill, dyno-mill and the like. In the media-less type, there are ultrasonic wave type, centrifugal type, high pressure type and the like. In the dispersing device of the high pressure type, capillary tubes whose diameter is from 1 μm to 2000 μm are used, and the maximal pressure in the dispersing device is preferably at least 9.8 MPa. It is thereby preferable that the highest speed is at least 100 m/s and the speed of heat transfer is at least 420 kJ/hr. Note that as the dispersing device of the high pressure type there are ultra-high pressure homogenizer (Microfluidizer™, produced by Microfluidics Corporation) or nanomizer (produced by Nanomaizaa KK). Further there is manton gouline type, as an other type of the high pressure type, which includes for example homogenizer produced by Izumi Food Machinery Co. Ltd., UHN-01 produced by Sanwa Machine Co. Ltd., and the like.

In order to prepare the cellulose acylate solution 31a, the solute is usually dissolved or dispersed at a room temperature. However, the dope may be prepared in a cool-dissolving method and a heat-dissolving method.

In the cool-dissolving method, the cellulose acylate and the additives (such as the particles and the like) are simultaneously added to a solvent in a temperature range of −10° C. to 40° C. near the room temperature, or gradually added with stirring by a stirrer. Otherwise, solutions or dispersions containing the respective components may be prepared and thereafter mixed. Then the mixture is cooled. In this case, a cooling bath may be used, for example, a dry ice/methanol bath (−75° C.), a diethylenegrycol bath (from −30° C. to −20° C.) or the like. During cooling the mixture, it is solidified, and thereafter heated to a temperature about in the range of 0° C. to 200° C., to obtain the dope in which each component moves in the solvent. Note that the solidified mixture may be left at a room or in a bath of hot water to make the temperature higher.

In the heat-dissolving method, the polymers and the additives are simultaneously added to a solvent in a temperature range of −10° C. to 40° C. near the room temperature, or gradually added with stirring by a stirrer. Then the mixture is heated to have temperature in the range of 70° C. to 240° C. under pressure from 0.2 MPa to 30 MPa. Preferably the temperature is from 80° C. to 220° C. The heated solution or dispersion is cooled to a temperature lower than the lowest boiling point among the used solvents, and the temperature to which the dispersion or the solution is cooled is usually from −10° C. to 50° C. Preferably, the mixture is cooled with a cooling device in which a cooling medium (cooling water and the like) is used.

In the above described method, the prepared cellulose acylate solution 31a can have high concentration even though a condensation is not made, and the cellulose acetate solution is excellent in stablility. However, in order to dissolve the cellulose acylate more easily, the condensation may be made with use of a condensing device. The condensing method is not restricted especially. For example, in one of the condensing methods, a low concentration solution is fed between a cylindrical member and a roratable blade which is disposed in the cylindrical member. Then the temperature of the cylindrical member is controlled such that there may be a temperature difference between the cylindrical member and the fed solution. Thus the evaporation of the solvent is made and the high concentration solution can be obtained. In another one of the condensing methods, the low concentration solution is heated and flashed from a nozzle into a tank such that the flash-evaporation is made before the flashed solution reaches a wall of the tank. Thereby the solvent vapor is condensed and thereafter removed from the tank and the high concentration solution is obtained from the tank. Such methods already know are applied to the present invention.

Furthermore, in the present invention, the filtration of the cellulose acylate solution is made after the preparation thereof, such that the obtained film may have preferable properties and optical functions. As the filters, there are filter cloth, filter paper, metal mesh, metal fiber, non-woven cloth and the like. Further, when a criterion for the content of the undissolved foreign materials in the cellulose acylate solution is extremely strict, the filtration device is connected in series to make the filtration several times for improvement of the properties of the solution.

It is preferable in the present invention that the filtration is made in a situation that the solution contains the particles. Part of the particles is a main object to be removed by the filtration. Accordingly, when the particles are added after the filtration, the effect of the filtration becomes lower.

In the present invention, in the filtration device for filtrating the cellulose acylate solution 31a, the filter whose absolute filtration accuracy is 0.1–100 μm. The absolute filtration accuracy is preferably 0.5–25 μm. The thickness of the filter is preferably 0.1–10 mm, particularly 0.2–2 mm. The filtration pressure is preferably at most 2.0 MPa, particularly at most 1.5 MPa, and especially at most 1.0 MPa.

When the filtration is made, the viscosity of the cellulose solution 31a is preferably at most 1000 Pa·s particularly at most 500 Pa·s, especially at most 100 Pa·s, and most especially at most 50 Pa·s. As the main material of the filter, materials already known are preferably used such as glass fiber, cellulose fiber, filter paper, fluorocarbon resin including polytetrafluoro ethylene, and especially ceramics, metal and the like. The shape of the filter may be a surface type or a depth type. However, the depth type is preferable as the filter is hardly occluded.

In the present invention, the casting of the cellulose acylate solution 31a may be made so as to form a single layer or so as to form plural layers. When it is designated to form the plural layers, the cellulose acylate solutions may be sequentially cast from casting dies disposed at intervals in a moving direction of the belt 22, or the cellulose acylate solutions may be cast at the same time from plural solution outlets of one casting die so as to make the co-casting. The present invention is not restricted in these casting methods, and other methods may be applied.

In the casting for forming the plural layers, the plural cellulose acylate solutions may be same or different. Further, when it is designated to form at least three layers in the casting, the particles may be contained in the outermost layers at least so as to be effective, and therefore the particles are added to the cellulose acylate solutions for forming the outermost layers. In this case, it is to be noted that the other layers may contain the particles than the outermost layers, and also all layer may contain them. Further, when plural layers are formed, it is often necessary to provide different functions for the plural cellulose acylate layers. In this case, the cellulose acylate solutions are prepared for forming the respective plural layers, and cast from the solution outlets. In the present invention are further cast not only the cellulose acylate solutions but also different solutions for forming other functional layers sequentially or at the same time, such as an adhesive layer, a dying layer, an antistatic layer, a UV-absorbing layer, a polarizing layer and the like.

In the present invention, the preferable solvent materials of the cellulose acylate solution 31a is preferably organic solvent materials selected from esters, ketones, ethers (each molecule of them have 3–12 carbons), and halogenated hydrocarbon (each molecules 1–7 carbons). The esters, ketones and ethers may have cyclic structures. Further, the compounds having at least two of the functional groups of the esters, ketones and ethers (namely, —O—, —CO—, and —COO—) are used as a main solvent, and may have at least two sorts of other functional groups, such as alcoholic hydroxyl group. In this case, the number of carbon atoms in one molecule is determined on the basis of the above ranges corresponding to the functional groups.

Further, the esters of 3–12 carbon atoms are, for example, ethyl formate, propyl formate, pentyl formate, methyl acetate, ethyl acetate, and pentyl acetate.

The ketones of 3–12 carbon atoms as the main solvent are, for example, acetone, methylethyl ketone, diethyl ketone, diisobutyl ketone, cyclopentanone, cyclohexanone, and methylcyclohexanone.

The ethers of 3–12 carbon atoms as the main solvent are, for example, diisopropyl ether, dimethoxymethane, dimethoxyethane, 1,4-dioxane, 1,3-dioxolan, tetrahydrofuran, anisole, and phenetole. Note that the organic solvent materials having at least two sorts of functional groups are, for example, 2-ethoxyethyl acetate, 2-methoxyethanol and 2-butoxyethanol. Further, the halogenated hydrocarbon is, for example, dichloromethane, dichloromethylene and the like.

Further, in the present invention, the solvent may contain alcohols. The preferable alcohols are monoalcohols or dialcohols, in which each molecule have the at least 1 and at most 8 carbon atoms, and the especially preferable alcohols are, for example, methanol, ethanol, 1-propanol, 2-propanol, 1-butanol, 2-butanol, tert-butanol, 1-pentanol, 2-methyl-2-butanol, cyclohexanol and the like. Only one of them may be mixed to the main solvent, and mixture of at least two of them may be added to the main solvent. The weight percentage of the above alcohols to the total solvent materials is preferably 2 wt. %–40 wt. %, particularly 3 wt. %–30 wt. %, and especially 5 wt. %–20 wt. %.

The cellulose acylate film 31b of the present invention may be stretched with use of the tenter device. The stretch of the cellulose acylate film 31b is performed such that the retardation values at the film surface may become higher. The stretch is made at the room temperature or in the heating of the cellulose acylation film 31b. Further, a uniaxial stretch or a biaxial stretch is made. The heating temperature in the stretch is preferably lower than the glass transition temperature of the cellulose acylate. The cellulose acylate film 31b can be stretched in the drying process, and the effect of the stretching is especially large when the solvent remains in the cellulose acylate film 31b. For example, when the rotating speed of the rollers 23 is adjusted to make the winding speed of the cellulose acylate film 31b higher than the peeling speed thereof, the cellulose acylate film 31b is stretched. Further, the side portions of the cellulose acylate film 31b may be kept by the tenter device, and thus the film is stretched such that the width thereof may become larger gradually. Otherwise, after the drying of the cellulose acylate film 31b, the stretch is made with use of a stretching machine, such as a long stretching machine and the like.

The thickness of the cellulose acylate film 31b of the present invention is different depending on purposes of use, and therefore is not restricted. The thickness is regulated by adjusting the content of the solid materials in the cellulose acylate solution 31, the distance between lips of the casting die 21, the pressure for discharging the solution from the casting die 21, the moving speed of the belt 22, and the flow rate of the throughput cellulose acylate solution from the casting die 21.

EXPERIMENT

An experiment of the present invention is made. The explanation therefore is made in followings, and the present invention is not restricted in followings.

The dispersion is prepared from the following contents. They are mixed and precisely controlled dispersion is made with an attritor such that the averaged diameter in volume may be 0.5 µm. Thus the dispersion containing the micro particles is obtained. The averaged diameter in volume is measured with a Laser Diffraction Particle Size Analyzer LA920 (produced by Horiba Ltd.). Note that the surface of the silicon dioxide particles described below is positively charged.

| | |
|---|---|
| silicon dioxide particles (Aerosil RA200HS, Produced by Nippon Aerosil) | 2.00 pts. wt. |
| cellulose triacetate (degree of acetylation is 61.0%) | 2.00 pts. wt. |

-continued

| | |
|---|---|
| triphenyl phosphate (TPP) | 0.16 pts. wt. |
| biphenyldiphenyl phosphate | 0.08 pts. wt. |
| dichloro methane | 88.10 pts. wt. |
| methyl alcohol | 7.66 pts. wt. |

A mixture solvent of dichloro methane and methyl alcohol is prepared such that a ratio in weight of them may be 92:8. Then the mixture solvent is added to following solid materials. This mixture is stirred to make the dissolution, so as to obtain 18.5 wt. % cellulose acylate solution as a base material. The above dispersion 6.5 pts.wt is added to 100 pts.wt of the base material. Then the stirring is made to obtain the cellulose acylate solution 31a, which is filtrated with use of a filter paper (#63, produced by Toyo Roshi Kaisha Ltd.).

| | |
|---|---|
| cellulose triacetate (degree of acetylation is 61.0%) | 89.3 pts. wt. |
| triphenyl phosphate (TPP) | 7.1 pts. wt. |
| biphenyldiphenyl phosphate | 3.6 pts. wt. |

The cellulose acylate solution 31a obtained by the above method is stocked in the stock tank 12, and thereafter filtrated with a filtration device 14. As the filter of the filtration device 14, a metal filter (No. 06N, nominal pore diameter is 10 μm, produced by Nippon Seisen Co., Ltd.) is used. The flow rate of the pump 13 is controlled such that the filtration pressure may be $0.3 \times 10^6$ Pa at starting feeding the cellulose acylate solution.

The cellulose acylate solution 31a is cast on the belt 22, and dried to peel as the cellulose acylate film 31b from the belt 22. Thereafter the cellulose acylate film 31b is dried in the drying processing to have the thickness 80 μm. Then 0.1 m² of the obtained cellulose acylate film 31b is sampled, and disposed on a flat stage. The number of foreign materials is counted in observation with eyes.

In the sample, there are areas in which the foreign materials are not observed, and those in which the foreign materials are observed. Each area of the one foreign material is cut out to a fragment, and elemental analysis for the each area is made with use of elemental analyzer (XMA). In consideration of the result of the elemental analysis are separately counted the number A of the foreign materials containing silicon more than the area in which the foreign materials are not observed and the number B of the foreign materials containing silicon the same as or less than the area. The result is shown in Table 1. In Table 1, Solution X is the cellulose acylate solution 31a sampled when the filtration pressure increases to $0.4 \times 10^6$ Pa, and Solution Y is the cellulose acylate solution 31a sampled when the filtration pressure increases to $1.0 \times 10^6$ Pa. Sample X is the film produced from Solution X and Sample Y is the film produced from Solution Y.

[Comparison]

The silicon dioxide particles was Aerosil R972 (Produced by Nippon Aerosil). Other conditions were the same as Example.

TABLE 1

| | Sample X | | Sample Y | |
|---|---|---|---|---|
| | Number A | Number B | Number A | Number B |
| Example | 2 | 11 | 0 | 13 |
| Comparison | 1 | 14 | 16 | 10 |

While the Sample X is produced from the cellulose acylate solution 31a filtrated at the lower filtration pressure of $0.4 \times 10^6$ Pa, the Numbers A&B are almost the same between Example and Comparison. Therefore when the filtration pressure is low as in Sample X, the numbers of the foreign materials from which silicon is detected is almost the same. However, when the filtration pressure becomes large to $1.0 \times 10^6$ Pa, the Number A is much larger in Comparison than Example, and the Number B is almost the same between Example and Comparison. Therefore, the number of the foreign materials in Sample Y of higher filtration pressure becomes smaller when the silicon whose surface is positively charged is contained in the dope.

As the different element between Samples X and Y is only the filtration pressure, the film formed from the dope containing particles whose surfaces are positively charged is more excellent than from the dope containing particles whose surfaces are not positively charged. According to the result of this experiment, the following estimations can be made. When the particles whose surfaces are positively charged are used, the aggregation would not occur in the filter, and therefore, the reason of the result of the experiment may be that the clusters (or aggregated particles) would not be contained in the filtrated solution even though the pressure would become higher.

Various changes and modifications are possible in the present invention and may be understood to be within the present invention.

The invention claimed is:

1. A cellulose acylate solution, containing silicon dioxide particles whose surface is positively charged.

2. A cellulose acylate solution as defined in claim 1, said cellulose acylate solution being obtained by steps of mixing said particles whose surface is positively charged with cellulose acylate and solvent, and then filtrating the resulting mixture under filtration conditions where the particles remain in the mixture.

3. A cellulose acylate solution as defined in claim 2, wherein said cellulose acylate solution is cast for forming a cellulose acylate film.

4. The cellulose acylate solution of claim 1, wherein the particles are positively charged by one or more functional groups on the surface of the particles that are selected from the group consisting of amino groups, ammonium groups, phosphonium groups and pyridinium groups.

5. The cellulose acylate solution of claim 1, wherein the particles have an average initial diameter of 0.001–20 μm.

6. The cellulose acylate solution of claim 1, wherein the particles have an apparent specific gravity of at least 30 g/liter.

7. The cellulose acylate solution of claim 1, wherein the particles are at a concentration of at most 30% by mass.

8. The cellulose acylate solution of claim 2, wherein the filtering is with a filter having an absolute filtration accuracy of 0.1–100 μm.

9. The cellulose acylate solution of claim 2, wherein the filtering is with a filter having a thickness of 0.1–10 mm.

10. The cellulose acylate solution of claim 2, wherein the filtering has a filtration pressure of at most 2.0 MPa.

11. The cellulose acylate solution of claim 2, wherein the cellulose acylate solution has a viscosity of at most 1000 Pa·s when the filtering step is performed.

12. The cellulose acylate solution of claim 3, wherein the cellulose acylate solution is cast to form a single layer.

13. The cellulose acylate solution of claim 3, wherein the cellulose acylate solution is cast to form plural layers, which may be the same or different.

* * * * *